(12) United States Patent
Klug

(10) Patent No.: US 6,323,971 B1
(45) Date of Patent: Nov. 27, 2001

(54) HOLOGRAM INCORPORATING A PLANE WITH A PROJECTED IMAGE

(75) Inventor: Michael A. Klug, Austin, TX (US)

(73) Assignee: Zebra Imaging, Inc., Pflugerville, TX (US)

( * ) Notice: Subject to any disclaimer, the term of this patent is extended or adjusted under 35 U.S.C. 154(b) by 0 days.

(21) Appl. No.: 09/694,463

(22) Filed: Oct. 23, 2000

(51) Int. Cl.⁷ ........................................... G03H 1/28
(52) U.S. Cl. .................. 359/24; 359/1; 359/32; 352/86; 353/10
(58) Field of Search .................. 359/1, 22, 24, 359/32; 352/86; 353/10

(56) References Cited

U.S. PATENT DOCUMENTS 5,172,251   12/1992   Benton et al. ............................ 359/9

*Primary Examiner*—Darren Schuberg

(74) *Attorney, Agent, or Firm*—Skjerven Morrill MacPherson LLP; Mary Jo Bertani

(57) ABSTRACT

A system and method for generating a composite display that includes at least one static three dimensional holographic image, and dynamic and/or static two dimensional images. An object hologram includes a three-dimensional object image. A silhouette hologram includes a silhouette image of the object, and can include a diffusion screen. The object hologram overlays the silhouette hologram with the object image substantially aligned with the silhouette image. Static and/or dynamic images can be projected on the diffusion screen or alternative background, forming a composite image that includes dynamic and/or static two-dimensional imagery combined with the static three-dimensional object image. The silhouette image thus provides a background for viewing the object image and occludes the two-dimensional imagery from the view of the object image. The silhouette hologram can be illuminated with a first light source that is projected from an angle with respect to the beam of a second light source that illuminates the object hologram.

24 Claims, 2 Drawing Sheets

HOLOGRAM INCORPORATING A PLANE WITH A PROJECTED IMAGE

BACKGROUND OF THE INVENTION

1. Field of the Invention

This invention generally relates to the field of holographic displays. More specifically, this invention relates to producing displays that include three dimensional holographic images and two-dimensional static and/or dynamic images.

2. Description of the Related Art

There is interest is holographic three-dimensional displays that include two-dimensional static and/or dynamic imagery for a variety of applications, including advertising, entertainment, and visualization.

A number of static three-dimensional displays are currently capable of being produced that provide limited animation by angularly multiplexing or linking each frame of animation to a specific horizontal or vertical viewing, angle. As the viewer chances viewing angles with respect to the display, the animation is "played," resulting in perceived motion. These displays, while termed "animated," cannot be updated in real time, and can only contain a few hundred static frames of animation at any time. Updating, the animation involves the time-consuming and costly process of completely re-recording the component images. Thus, these displays are classified as "static" rather than "active" displays.

Currently, there exist real-time imaging systems that can render and display computer generated holograms at video rates. Examples of such systems include holographic video (e.g., the systems described in U.S. Pat. No. 5,172,251 entitled "Three Dimensional Display System," naming Stephen A Benton and Joel S. Kollin as inventors) or LCD-lenticular systems. The displays produced by these systems are classified as active displays. The systems are capable of rendering full color images with up to a 36 degree view zone that range in size from 25×25×25 to 150×75×150 millimeters at rates ranging from around 1 to 20 frames per second, depending on the size and view zone of the image. These systems are currently expensive and impractical as they incorporate many complicated moving parts and require extremely high data processing bandwidth to generate and display the images.

Mirrored devices for creating aerial images have been known in the art for many years. Typically, a concave mirror in one form or another is utilized to project an image of an object into space so that to an observer, it appears that a copy of the object is located in a nearby area of space. The copy of the object appears to be levitating in mid-air. While the prior art provides numerous such devices for projecting three-dimensional optical images, the images are in general not "faithful" over a broad range of viewing angles, i.e. not congruent or geometrically similar to the object and must be viewed from a precise angle in order to avoid extreme distortion. Additionally, the prior art devices are not capable of producing images which appear to be located in an area of space far from the mirrored device.

U.S. Pat. No. 5,311,357 discloses a device which positions concave mirrors in a unique arrangement with respect to one another so to produce an image with greater clarity. Additionally, a videotape option allows a whole image to be broadcast and real objects merged with the broadcast image so that the entire combined image appears three-dimensional to a properly located observer. These displays can be classified as combination "active/static" because they incorporate a non-updateable three dimensional subject with a dynamic two dimensional screen display of standard video or film strip imagery.

These mirrored display devices tend to be expensive since there is a direct relationship between the object size and the optical components are that are required to produce the image of the object. Another concern arises in situations where a customer must pay for floor space. Additionally, these displays are not practically scalable, since some of the optics involved must be on the order of twice the size of the images. For example, image sizes over one cubic foot are not practical because they require display systems that are impractically large and cumbersome.

Therefore, with the limited systems of the prior art, projected images are not readily scalable. There exists a need for an improved image projecting device which will provide a large, scalable, faithful three-dimensional image which can be used in numerous applications such as advertising, entertainment, and visualization. It is also important for the improved image projecting device to maintain an occlusion depth cue when the three dimensional image is viewed from various perspectives.

SUMMARY OF THE INVENTION

The present invention provides a system and method for generating a composite display that includes at least one static three dimensional holographic image, and dynamic and/or static two dimensional images. In one embodiment, the static hologram of an object image is included on a transparent substrate, forming an object hologram. A silhouette hologram includes a three-dimensional silhouette image of the object image. The silhouette hologram can also include a holographic diffusion screen in the area surrounding the silhouette image. The object hologram overlays the silhouette hologram with the object image substantially aligned with the silhouette image. A first light source illuminates the object hologram, and a second light source illuminates the silhouette hologram. The silhouette image provides a background for viewing the object image. Static and/or dynamic images can be projected on the diffusion screen when it is included in the silhouette hologram, so that the composite image includes static and/or dynamic two-dimensional imagery combined with the static object image. With this assembly, the three-dimensional silhouette hologram maintains an occlusion depth cue for the object hologram even when it is viewed from various perspectives.

In another embodiment of the present invention, a method for generating a composite image that includes a three-dimensional holographic image is provided that includes:

generating a three dimensional object hologram on a transparent substrate;

generating a silhouette hologram having a three-dimensional silhouette image of the object hologram; and overlaying the silhouette hologram and the object hologram such that the silhouette image and the object image are substantially aligned.

One feature of the present invention includes a black, three-dimensional silhouette hologram that absorbs the light from the second light source and provides a background for the object hologram that is illuminated by the first light source.

Another feature of the present invention is a diffusion screen that reflects the light from the second light source and provides a screen for displaying the projected image. The projected image appears to the viewer as being behind the object image of the composite display.

With the present invention, various types of static and/or dynamic projected images can be combined with any number of object and silhouette holograms. The object holograms can be included on one or more transparent substrates and overlay the silhouette hologram. Different light sources at different angles can be used to illuminate the object hologram and the silhouette hologram so that they appear only when illuminated by the corresponding light source.

The present invention has several advantages over alternative technologies. First, it provides the occlusion depth cue that alternative aerial image displays cannot provide without having the physical object and video screen resident within the optical train. Second, images generated with the present invention are highly scaleable due to a tiling technique adapted to this type of hologram. This makes it possible to generate images of various sizes, and to package and display the images simply and compactly. Third, an image can be reconstructed with little or no distortion over a very wide viewing angle, such as 110 degrees horizontally by 90 degrees vertically, which contrasts greatly with other systems known in the prior art. Additionally, multiple dynamic and/or static images can be combined to generate the composite image.

The foregoing has outlined rather broadly the objects, features, and technical advantages of the present invention so that the detailed description of the invention that follows may be better understood.

BRIEF DESCRIPTION OF THE DRAWINGS

FIG. 1b shows three different viewpoints of an example of an object hologram on a transparent substrate that is used in conjunction with the three-dimensional silhouette hologram in FIG. 1a.

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

U.S. patent application Ser. No. 09/098,581, filed Jun. 17, 1998, entitled "Method and Apparatus for Recording One-step, Full-color, Full Parallax Holographic Stereograms," (hereafter "the '581 application"), discloses a system and method for producing static scaleable full parallax one-step full-color reflection holographic stereograms. The application discloses a mechanical-optical recording system and software capable of sequentially exposing multiple hologram elements ("hogels") in a boustrophedontic fashion so as to produce a hogel array. These arrays can reconstruct volumetric images with full parallax, and in full color. Large images may be composed of two or more smaller images, providing a highly scalable system.

Additionally, the system of the '581 application may be used to create scalable holographic optical elements (HOEs). One such element is a diffusion screen, upon which an image, such as moving video, can be projected from a specific angle and distance, and be seen through a particular viewing angle with respect to the HOE. If light impinges on this screen from any other angle, the screen will appear black. Such an HOE may be used to increase the brightness of the projected image by limiting the angles through which the projection light is allowed to be distributed, by allowing images to be viewed from a certain angle when displayed on the screen, or by allowing projection of images from a particular direction only. The '581 Application is assigned to the assignee of the present invention and is hereby incorporated herein by reference in its entirety.

Figure 1A:
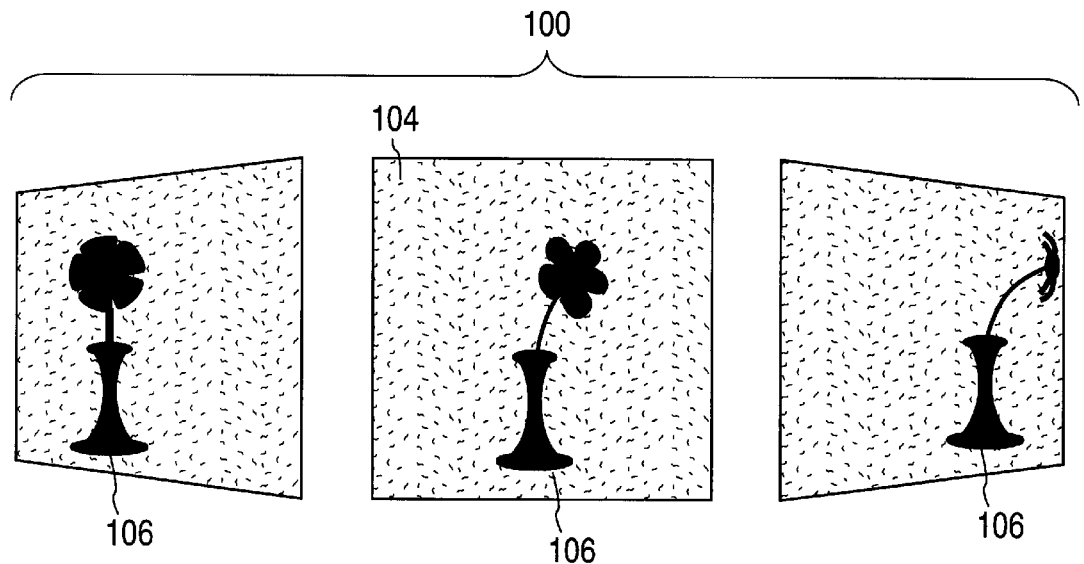
FIG. 1a shows three different viewpoints of an example of a three-dimensional silhouette hogram including a three-dimensional silhouette hologram and a three-dimensional diffusion screen.
Figure 1B:
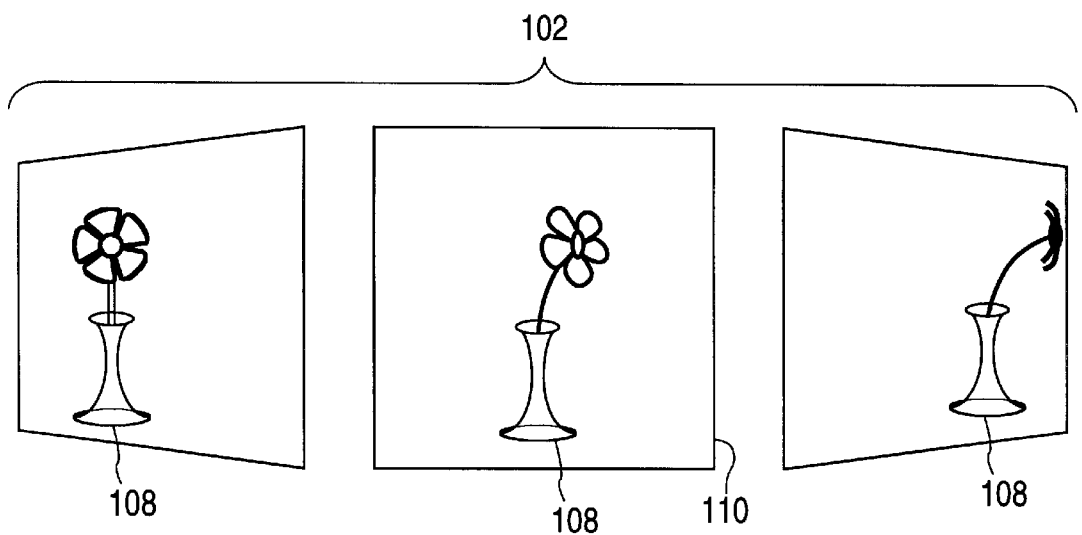

Referring now to FIGS. 1a and 1b, in one embodiment, the present invention utilizes two or more holographic stereograms (holograms) that are fabricated, for example, in accordance with the invention disclosed in the '581 application. An example of a silhouette hologram 100 is shown in FIG. 1a and a corresponding object hologram 102 is shown in FIG. 1b. Silhouette hologram 100 incorporates a hologram of a colored or white off-axis diffusion screen 104 at the plane of silhouette hologram 100, which serves as a projection screen. Silhouette hologram 100 also includes three-dimensional silhouette image 106 of one or more objects in front of the plane of silhouette hologram 100.

Silhouette image 106 is a holographic image of the unlit object as it appears in object image 108. Object hologram 102 is an off-axis hologram of object image 108 on transparent substrate 110 that overlays silhouette hologram 100 such that silhouette image 106 is superimposed spatially on object image 108. Silhouette hologram 100 is another off-axis hologram. Object image 108 and silhouette image 106 are visible when object hologram 102 and silhouette hologram 100 are illuminated from appropriate angles and distances. When object hologram 102 is illuminated simultaneously with silhouette hologram 100, their images are superimposed and object hologram 102 will appear translucent, allowing simultaneous visibility of other objects that may be behind or in front of object hologram 102.

Note that object hologram 102 and silhouette hologram 100 are typically illuminated by different light sources at different angles from one another as further explained hereinbelow. In some implementations, however, the same light source may be used to illuminate both object hologram 102 and silhouette hologram 100. When the two angles for illuminating object hologram 102 and silhouette hologram 100 coincide, a single light source will reconstruct both object image 102 and silhouette image 106 simultaneously. If the angles for illuminating the holograms do not coincide, simultaneously activating the illumination sources produces superimposed imagery in which holograms 100, 102 will appear, allowing visibility of other images that may be behind or in front. Object hologram 102 will exhibit maximum contrast when silhouette image 106 is black, since black will absorb all non-diffracted light.

In one embodiment, the angle of illumination for object hologram 102 is one hundred eighty degrees from the angle of illumination for silhouette hologram 100, so that holograms 100, 102 may be illuminated from very disparate points. Various other combinations of illumination angles may be used, however. For example, silhouette hologram 100 can be created with one orientation with respect to the reference beam used to create the hologram, i.e., one orientation in the holographic printer, and object hologram 102 can be in an orientation rotated 180 degrees with respect to that of silhouette hologram 100. When sandwiched together, object hologram 102 is rotated 180 degrees with respect to silhouette hologram 100 so that the illumination angle for each is equal and opposite with respect to the normal of the holographic plane.

In the present invention, object hologram 102 overlays silhouette hologram 100. When holograms 100 and 102 are illuminated simultaneously, object hologram 102 produces object image 108 having the background color of silhouette image 106. Illumination of silhouette hologram 100 produces an image of diffusion screen 104, that appears in areas that are not in line with the viewpoint of object image 108 or silhouette image 106.

When a hologram of an object is illuminated and viewed from different perspectives, the object appears as a three-dimensional image, as known in the art. In the present invention, three-dimensional silhouette hologram 100 provides a three-dimensional image when illuminated and viewed from different perspectives. The frames shown in FIG. 1a correspond to views of silhouette image 106 from three different perspectives.

Figure 2:
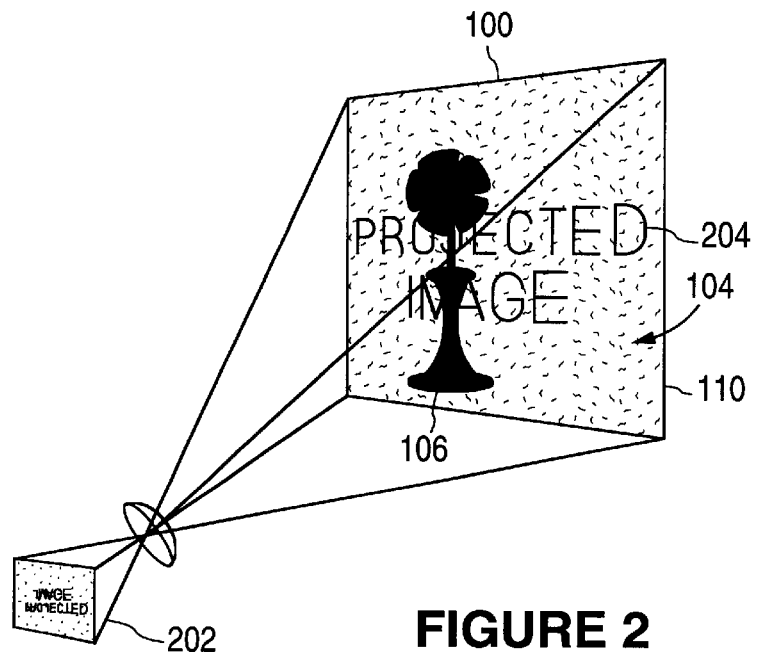
FIG. 2 shows a example of a projection scheme combining the three-dimensional silhouette hologram with a projected image.

The frames shown in FIG. 1b correspond to views of object hologram 102 from the same three different perspectives as the frames of silhouette hologram 100 in FIG. 1a. Note that the shape of silhouette image 106 substantially corresponds to the shape of object image 108 when silhouette hologram 100 and object hologram 102 are viewed from the same perspective. In the case of holograms created using computer graphics images, this correspondence can be created by design, i.e., each computer graphics image used silhouette hologram 100 is based directly on the computer graphics images used for object hologram 102. In the case of holograms created using real objects, silhouette hologram 100 is created using an un-illuminated real object. Referring to FIG. 2, in another embodiment, a dynamic or static image projector 202, such as an LCD projector, a gobo projector, or a slide projector, is used to illuminate silhouette hologram 100, and the resultant projected image 204 will appear to be behind the static silhouette hologram 100. The projected image will not appear in the area of silhouette image 106 because no light is deflected to those areas in the image volume. The silhouette image 106 occludes the projection image 204 as if it physically occupies the space between the viewer and silhouette hologram 100.

Figure 3:
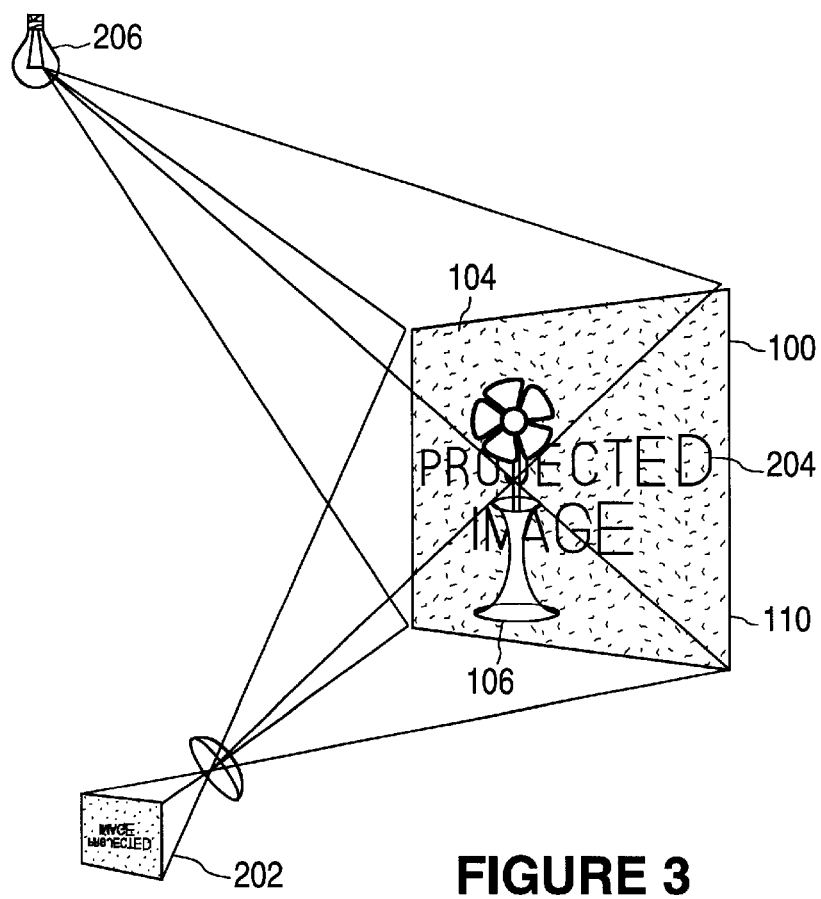
FIG. 3 shows an example of a projection scheme combining the three-dimensional silhouette hologram, the object hologram, and a projected image.

Referring now to FIG. 3, object hologram 102 is positioned in line with silhouette image 106 on silhouette hologram 100 such that object image 108 is superimposed with silhouette image 106. When object hologram 102 and silhouette hologram 100 are illuminated from appropriate directions, the resulting image volume of object image 108 superimposes the image volume of silhouette image 106. FIG. 3 shows object hologram 102 being illuminated by light source 206, while the light from projector 202 illuminates silhouette hologram 100. Light source 206 and projector 202 illuminate object hologram 102 and silhouette hologram 100, respectively, from different angles.

The projected image 204 can include any type of images or graphics that can be projected on silhouette hologram 100. Further projected image 204 can be static or dynamic, or a combination of static and dynamic imagery. Further projected images 204 are not required to, but can be related aesthetically or structurally to object hologram 102.

Thus, the present invention includes at least one object hologram 102 mounted on transparent substrate 110, and a corresponding silhouette hologram 100 that includes silhouette image 106. In one embodiment, silhouette hologram 100 also includes an image of diffusion screen 104 to provide a background for displaying projected image 204. Silhouette hologram 100 and object hologram 102 are sandwiched together either fixedly or moveably, and are rotationally-oriented so that separate illumination beams are required to illuminate one or more object holograms 108 and corresponding silhouette holograms 100. In this configuration, the illumination beams do not reconstruct the image information for any other image. The viewer perceives a background behind the images that is provided by light diffused by image of diffusion screen 104.

The image of diffusion screen 104 does not contribute to a perceived translucency in object hologram 102 as described above. As the viewer changes position, the silhouette hologram 100 occludes a corresponding portion of the image of diffusion screen 104, depending on the viewpoint. The result is an image in which two dimensional projected images 204 are reflected/diffracted by silhouette hologram 100, and the three dimensional object image 108 is produced by light directed toward the sandwiched holograms 100, 102 and reflected/diffracted by the object hologram 102.

The present invention has several advantages over alternative technologies. First, it provides the occlusion depth cue that alternative aerial image displays cannot provide without having the physical object and video screen resident within the optical train. A further advantage is that images generated with the present invention are highly scaleable due to the tiling technique disclosed in the '581 application that can be utilized with the present invention. The scale of the images produced does not depend on the size of the optics involved in image reconstruction, as it is with parabolic mirror systems known in the prior art. It is important to note that the present invention can also be practiced with other types of holograms such as transmission or reflection holograms, and holograms of physical objects as well as computer graphics.

Another advantage is that the system of the present invention can reconstruct an image with little or no distortion over a very wide viewing angle, such as 110 degrees horizontally by 90 degrees vertically. This contrasts with mirror or lens-based displays which produce images with significant distortion that begins at as little as 10 (ten) degrees off-axis, and a restricted viewing angle of 30 to 40 degrees.

Another advantage is that the system of the present invention can combine multiple dynamic and/or static images by using multiple holograms and/or multi-channel imaging.

A still further advantage is that the imagery incorporated in the object holograms 108 and silhouette holograms 100 are not limited in size. This is because digitized or digitally-synthesized models are used rather than requiring an actual object, as in the convex mirror systems. These features make it possible to generate images of various sizes, and to package and display the images simply and compactly.

While the invention has been described with respect to the embodiments and variations set forth above, these embodiments and variations are illustrative and the invention is not to be considered limited in scope to these embodiments and variations. For example, any number of object images 102 can be included on one transparent substrate, or multiple transparent substrates. Corresponding silhouette images 106 are included on silhouette hologram 100. Further, they can be illuminated by light sources from different angles relative to each other, so that the object holograms can be illuminated individually. Accordingly, various other embodiments and modifications and improvements not described herein may be within the spirit and scope of the present invention, as defined by the following claims.

What is claimed is:

1. A system for generating a composite image that includes a three dimensional holographic image, the system comprising:

an object hologram having a three dimensional object image; and a silhouette hologram having a three dimensional silhouette image of the object hologram;

wherein the object hologram overlays the silhouette hologram so as to substantially align the object image and the silhouette image.

2. The system of claim 1, wherein the silhouette hologram further includes a holographic image of a diffusion screen.

3. The system of claim 2, further comprising a projected image, wherein the projected image is projected on the silhouette hologram.

4. The system of claim 1, further comprising:

a first illumination source for illuminating the object hologram; and a second illumination source for illuminating the silhouette hologram.

5. The system of claim 1, wherein the object image and the silhouette image are static images.

6. The system of claim 3, wherein the projected image is a dynamic image.

7. The system of claim 2, wherein the color of the silhouette image is black.

8. The system of claim 2, wherein the diffusion screen is white.

9. A composite image display including three-dimensional images and two dimensional images, comprising:

an object hologram including a three-dimensional object image;

a silhouette hologram including a screen and a three-dimensional silhouette image of the object image; and a two-dimensional image projected on the screen;

wherein the object image and the silhouette image substantially overlay each other.

10. The image display of claim 9, further comprising:

a first illumination source for illuminating the object hologram; and a second illumination source for illuminating the silhouette hologram.

11. The image display of claim 9, wherein the object image and the silhouette image are static images.

12. The image display of claim 9, wherein the image projected on the screen is a dynamic image.

13. The system of claim 9, wherein the color of the silhouette image is black.

14. A method for generating a composite image that includes a three dimensional holographic object image, the method comprising:

generating a three dimensional object hologram having an object image generating a silhouette hologram having a three dimensional silhouette image of the object hologram; and overlaying the silhouette hologram and the transparent substrate so as to substantially align the object image and the silhouette image.

15. The method of claim 14, wherein the silhouette hologram further includes an image of a diffusion screen.

16. The method of claim 15, further comprising displaying a projected image on the diffusion screen.

17. The method of claim 14, further comprising:

illuminating the object image with a first illumination source; and illuminating the silhouette image with a second illumination source.

18. The method of claim 14, wherein the object image and the silhouette image are static images.

19. The method of claim 16, wherein the projected image is a dynamic image.

20. The method of claim 15, wherein the color of the silhouette image is black.

21. The method of claim 15, wherein the diffusion screen is white.

22. The method of claim 16, further comprising:

projecting a plurality of projected images on the silhouette hologram.

23. The method of claim 16, further comprising:

generating a plurality of object holograms on one or more transparent substrates.

24. The method of claim 23, further comprising:

generating a plurality of silhouette images on the silhouette hologram, wherein the silhouette images correspond to the object holograms.

* * * * *